Oct. 26, 1948.    J. J. MASON    2,452,480
DEFECT DETECTOR FOR RAILWAY CAR WHEELS
Filed Aug. 17, 1945
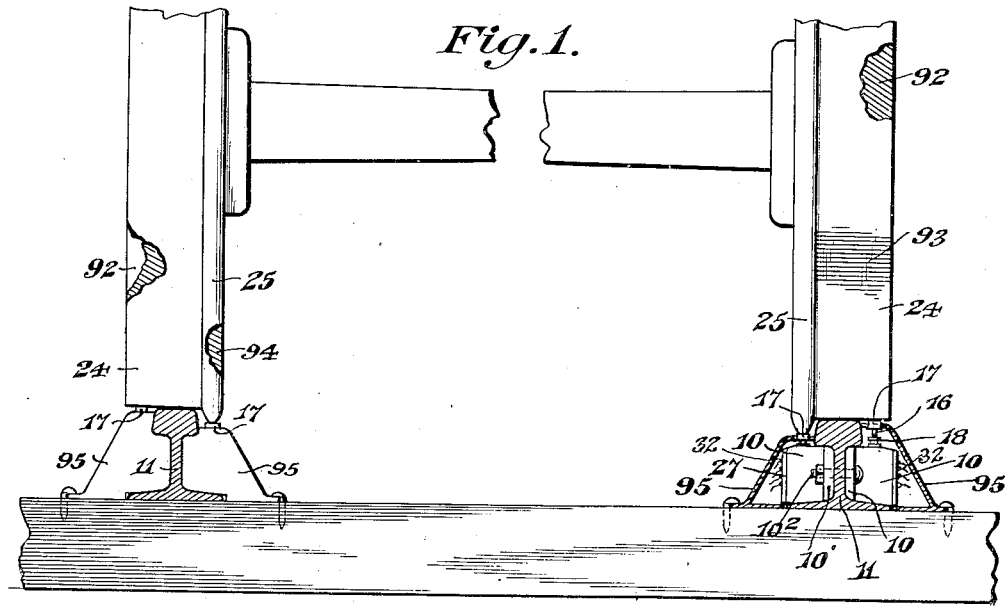
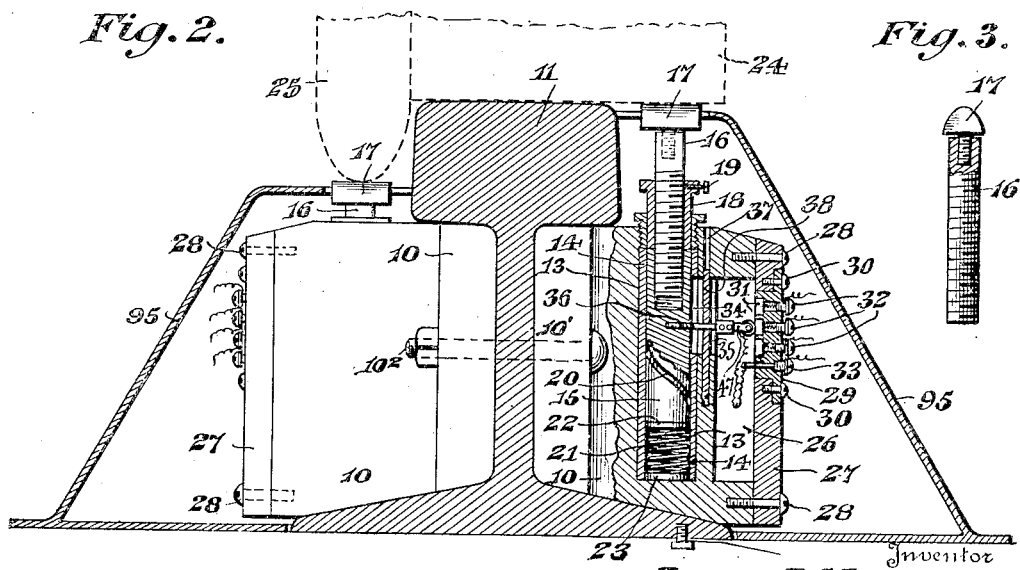
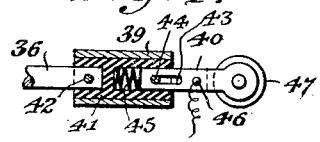
Inventor
James J. Mason,
By Geo. F. Kimmel.
Attorney Patented Oct. 26, 1948

2,452,480

UNITED STATES PATENT OFFICE 2,452,480

DEFECT DETECTOR FOR RAILWAY CAR WHEELS

James J. Mason, San Simon, Ariz.

Application August 17, 1945, Serial No. 611,075

2 Claims. (Cl. 246—246)

This invention relates to a contact device forming an element of a mechanism for indicating defects in railway car wheels, axles, trucks, as well as for indicating broken, dragging and extending parts of rolling stock, while in motion on the rails, and has for its object to simplify and improve the construction and increase the efficiency of utility of contact devices of this character.

A further object of the invention is to provide, in a manner as hereinafter set forth, a contact device impacted by a mobile body for closing a recorder actuating circuit to provide for the operation of a suitable recording device for indicating the condition of certain of the parts of said mobile body, as well as the location of the part of said body when defective.

With these and other objects in view the invention consists in certain novel features of construction as hereinafter shown and described and then specifically pointed out in the drawings illustrative of the preferred embodiment of the invention.

In the drawings:

Figure 1 is a side elevation of two pairs of contact devices in accordance with this invention, showing the adaptation thereof with respect to a pair of track rails and a pair of car wheels and the axles for these latter, the rails being illustrated in section and the axle and wheels partly broken away, Figure 2 illustrates the adaptation of a pair of contact devices, in accordance with this invention, with respect to a track rail and the lower portion of a car wheel, one of the devices being illustrated in section, the other in side elevation, and the portion of wheel in dotted lines, Figure 3 is a sectional elevation of the adjustable plunger head, Figure 4 is a fragmentary section view of the circuit opening and closing element.

A defect indicating mechanism comprising in general a plurality of sets of contact devices attached to the opposite sides of track rails at suitable intervals, with the sets of devices located in terminal yards or at predetermined distances along the track, depending on the conditions, grade of contour of the line, and the recording device with which the contact devices are electrically connected may be located in telegraph offices convenient to the operator, or near a signal along the tracks convenient to the trainmen or at other points as required, such as the master car builder's office in the terminal yard.

The contact devices which are attached to the track rails are substantially alike and the description of one will suffice for all, the construction being illustrated more particularly in Figure 2. Each of the contact devices comprises a housing 10 having means such as ears $10^1$ and clamp bolts $10^2$ for attachment to the rails, represented as a whole at 11, and a number of contact devices will be attached to one or more of the rails to form a set, for instance about six inches apart more or less, and enough of them to make a distance equal to the circumference of a car wheel. Obviously the device could be attached with a clamp to the base of the rail, in the event the carrier objected to a hole through the web. I do not restrict myself to any method of attachment. Each of the housings 10 is formed with a vertical sleeve 13 having its wall provided with a wear surface 14.

Slidable in each sleeve 13 is a hollow plunger 15, the hollow portion being internally threaded to receive a threaded stud 16 provided with an enlarged head 17, threadedly connected with the stud.

The sleeve 13 terminates below the upper line of the ball or head of the rail 11, and a packing gland 18 is applied to the body to prevent the escape of oil or the entrance of dust or moisture. The threaded stud 16 is thus adjustable relative to the plunger 15, to control the position of head 17, and a clamp screw 19, which extends through a bushing at the upper end of the plunger 15 to lock the stud in adjusted position.

Each plunger is provided with a peripheral spiral groove 20 to distribute lubricant between the plunger and the bushing. A spring 21 is disposed within the sleeve 13 between the bottom of the sleeve 13 and plunger 15. Washers 22 and 23 are employed to receive the thrust of the spring. The studs 16 at the outer side of the rail will be of sufficient length to cause the heads 17 at that side to project normally above the upper line of the head of the rail to be engaged by the tread portion 24 of the car wheels, as shown in Figure 1, while the studs 16 at the inner side of the rail will project normally below the line of the rail head to be engaged by the flanges 25 of the wheels. The studs are of the same length, but the studs at the outer side of the track rail are adjusted to a greater height than the studs at the inner side of such rail.

The housing 10 is provided in its outer side with a relatively large recess 26, closed by a plate 27, which is detachably secured in position by clamp screws 28. The plate 27 is formed with an opening in which is mounted a contact support 29 capable of being reversed, and the said support 29 is detachably secured in position by clamp screws 30.

Embedded in the inner face of each support 29 are a plurality of superposed contacts 31 arranged in lengthwise alignment. Threaded into the outer side of each of the supports 29 opposite each of the contacts 31 is a binder post 32, and likewise threaded through the member 29 is a separate binder post 33. The binder posts 32 are coupled respectfully to the contacts 31, as shown in Figure 2, by conductor wires. Formed in the side of the sleeve 13 in a vertical slot 34, and formed in the housing 10 in alignment with the slot 34 and communicating with the recess 26, is a vertical slot 35. Tapped into the plunger 15 and extending through the aligned slots is a rod 36, the rod being thus bodily carried with the plunger 15.

Formed in the portion of the housing 10, between the sleeve 13 and the recess 26, is a guideway 37 in which a stop plate 38 is slidably disposed and engaged by the rod 36. The plate 38 thus serves as a movable cutoff or packing to prevent oil from passing from the plunger and sleeve to the recess 26.

Extending from the rod 36 and coupled thereto by a sleeve 39 (see Fig. 4) is another rod 40 having a contact at its outer end to engage the contacts 31. An insulating packing 41 is disposed within the sleeve 39 and enclosing the confronting ends of the rods 36 and 40, to provide for insulating the rod portion 40 from the rod portion 36, as depicted in Fig. 4.

The rod 36 is rigidly coupled to the sleeve 39 and the insulation 41 by a pin 42, while the rod 40 is longitudinally slotted, as at 43, to receive a transverse pin 44 whereby the two rods are longitudinally adjustable, a spring 45 being disposed between the inner end of the rod 40 and the insulation 41 as shown in Fig. 4. The contact terminal rod 40 may be of any desired form, preferably a roller 47. The rod 36 and elements 39 to 45 inclusive and 47 form a spring controlled circuit opening and closing element extended laterally from the plunger and the said element has a circuit connection 46 with the binding post 33.

What I claim is:

1. A contact device for the purpose set forth comprising a fixed housing adapted to be arranged at one side of a track rail and provided with a vertically disposed plunger chamber, a set of spaced contacts insulated from each other, mounted in and insulated from the housing and spaced from said chamber, said chamber having a slotted wall, a vertically movable spring controlled plunger operating in said chamber and provided with a vertically adjustable head impacted by a mobile body travelling over the track rail for varying the upward movement of the plunger, and a spring controlled circuit opening and closing element bodily movable with, connected to and extended laterally from the plunger, said element extended through said slot and cooperating with said contacts to close an actuating circuit when the plunger moves from normal position.

2. A contact device for the purpose set forth comprising a fixed housing adapted to be arranged at one side of a track rail and provided with a vertically disposed plunger chamber, a set of superposed, spaced contacts insulated from each other and mounted in and insulated from said housing and further spaced from said chamber, a vertically movable plate arranged within the housing and interposed between and spaced from said chamber and contacts, a vertically movable spring controlled plunger operating in said chamber and provided with a vertically adjustable head impacted by a mobile body travelling over the track rail for varying the vertical movement of the plunger from normal, the wall of said chamber provided with a slot, and a spring controlled circuit opening and closing element bodily carried by the plunger, fixed thereto and extending laterally therefrom, said element extended through said slot and plate and coacting with said contacts to close an actuating circuit when the plunger moves from normal position.

JAMES J. MASON.

REFERENCES CITED

The following references are of record in the file of this patent:

UNITED STATES PATENTS

| Number | Name | Date |
| --- | --- | --- |
| 929,444 | Kane | July 27, 1909 |
| 1,149,787 | Sebok, Jr. | Aug. 10, 1915 |
| 1,378,465 | Kean et al. | May 17, 1921 |
| 1,818,970 | Clausen | Aug. 18, 1931 |
| 1,877,184 | Livingston | Sept. 13, 1932 |
| 1,908,204 | Winning | May 9, 1933 |
| 1,977,170 | Clement et al. | Oct. 16, 1934 |
| 2,095,616 | Post | Oct. 12, 1937 |
| 2,277,099 | Harshman | Mar. 24, 1942 |